US010250172B2

United States Patent
Boscolo Berto (10) Patent No.: US 10,250,172 B2
(45) Date of Patent: *Apr. 2, 2019

(54) APPARATUS FOR DETECTING THE ROTOR POSITION OF AN ELECTRIC MOTOR AND RELATED METHOD

(71) Applicant: STMICROELECTRONICS S.R.L., Agrate Brianza (IT)

(72) Inventor: Michele Boscolo Berto, Sesto San Giovanni (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/277,684

(22) Filed: Sep. 27, 2016

(65) Prior Publication Data

US 2017/0019042 A1    Jan. 19, 2017

Related U.S. Application Data

(62) Division of application No. 14/641,956, filed on Mar. 9, 2015, now Pat. No. 9,525,371.

(30) Foreign Application Priority Data

Mar. 31, 2014  (IT) .............................. MI2014A0555

(51) Int. Cl.
*H02P 6/18*     (2016.01)
*G01D 5/20*     (2006.01)
*H02P 27/08*    (2006.01)

(52) U.S. Cl.
CPC .............. *H02P 6/18* (2013.01); *G01D 5/2006* (2013.01); *H02P 27/08* (2013.01)

(58) Field of Classification Search
CPC ...... H02P 6/182; H02P 6/085; H02P 2209/07; H02P 6/22; H02P 6/20; H02P 6/18
USPC ........................................ 318/400.32, 400.33
See application file for complete search history.

(56) References Cited

U.S. PATENT DOCUMENTS

| | | |
|---|---|---|
| 4,520,302 A | 5/1985 | Hill et al. |
| 4,876,491 A | 10/1989 | Squires et al. |
| 5,028,852 A | 7/1991 | Dunfield |
| 5,117,165 A | 5/1992 | Cassat et al. |
| 5,254,914 A | 10/1993 | Dunfield et al. |

(Continued)

FOREIGN PATENT DOCUMENTS

| | | |
|---|---|---|
| DE | 102006043683 | 3/2008 |
| DE | 102008034590 | 2/2009 |
| EP | 1309078 | 8/2005 |

*Primary Examiner* — Rina I Duda
(74) *Attorney, Agent, or Firm* — Slater Matsil, LLP (57) ABSTRACT

An apparatus for detecting a position of a rotor of a DC motor with N phases having a plurality of windings. The apparatus includes circuitry to couple at least two of the windings between a supply voltage and a reference voltage according to a first current path and allow the current stored in the two windings to be discharged through a second current path. The circuitry is configured to force the at least two windings at a short circuit condition in the second current path. The apparatus also includes a measurement circuit configured to measure the time period of discharging the current stored in the two windings and a rotor position detector for detecting the rotor position based on the measured time period.

12 Claims, 8 Drawing Sheets

(56) References Cited

U.S. PATENT DOCUMENTS

| | | | |
|---|---|---|---|
| 5,552,685 A * | 9/1996 | Young | H02P 6/08 318/268 |
| 5,691,613 A | 11/1997 | Gutwillinger | |
| 6,011,368 A * | 1/2000 | Kalpathi | H02H 7/093 318/254.2 |
| 6,445,155 B1 * | 9/2002 | Williams | H02P 6/085 318/400.33 |
| 6,841,903 B2 | 1/2005 | Boscolo et al. | |
| 6,885,163 B2 | 4/2005 | Heidrich | |
| 8,040,095 B2 | 10/2011 | Berto | |
| 8,970,150 B2 | 3/2015 | Boscolo | |
| 2004/0183488 A1 * | 9/2004 | Fuse | H02P 6/16 318/400.09 |
| 2007/0110410 A1 | 5/2007 | Narumi et al. | |
| 2010/0141192 A1 * | 6/2010 | Paintz | H02P 6/185 318/400.33 |
| 2010/0181952 A1 | 7/2010 | Cheng | |
| 2011/0248659 A1 * | 10/2011 | Balazovic | H02P 6/183 318/400.33 |
| 2012/0098474 A1 * | 4/2012 | Boscolo | H02P 6/185 318/400.33 |
| 2012/0206077 A1 * | 8/2012 | Yoneshima | H02P 6/185 318/400.33 |
| 2013/0106333 A1 * | 5/2013 | Durkee | H02P 6/186 318/400.33 |
| 2014/0035502 A1 | 2/2014 | Wang et al. | |

* cited by examiner

APPARATUS FOR DETECTING THE ROTOR POSITION OF AN ELECTRIC MOTOR AND RELATED METHOD

This application is a divisional application of U.S. patent application Ser. No. 14/641,956, filed on Mar. 9, 2015, now U.S. Pat. No. 9,525,371, which claims priority to Italian Application No. MI2014A000555 filed Mar. 31, 2014, all of which are hereby incorporated herein in their entireties by reference.

FIELD OF THE INVENTION

The present disclosure relates to an apparatus for detecting a rotor position of an electric motor, particularly of a brushless motor, and to a related method.

BACKGROUND

The identification procedure for identifying the position of a rotor in a sensorless brushless DC motor (BLDC), normally called "inductive sense", takes advantage of the different response of the current in the motor winding with respect to a voltage pulse applied to the ends of the windings of the motor itself. The knowledge of the rotor position permits optimizing the motor startup procedure and is therefore a very important factor. The procedures of identifying the rotor position should therefore be characterized by high performances in terms of precision and insensitivity to disturbances.

Indeed an error in detecting the rotor position may result in an imprecise excitation sequence of the stator phases and in a consequent efficiency reduction or, in the worst case, in a failure of the motor start-up procedure (loss of synchronism).

The previous methods of detecting the rotor position (inductive sense) may only ensure good performance under conditions of unchanging supply voltage and precise current measurement.

The methods commonly used for detecting the position of the rotor, so called inductive sense methods, are based on the analysis of the current in the windings based upon a current pulse applied to the windings themselves. The different responses to the current pulses are based on the magnetic saturation level of the windings, which is a function of the position of the rotor position. In this way, the magnetic saturation level allows detection of the rotor position.

EP 1309078 discloses a method for detecting the position of a rotor of a DC motor with N phases having a plurality of windings. The method includes the steps of coupling at least two of the windings between the supply voltage and ground according to a first current path for a prefixed time (Tact), allowing the current stored in the two windings to discharge through a second current path, comparing the voltage at the ends of one of the two windings with a prefixed voltage and providing a control signal when the voltage is smaller in absolute value than the prefixed voltage. The method also includes performing the above steps for each of the windings of the DC motor and detecting the position of the rotor based on the control signals obtained.

This method is sensitive to the power supply variation because the current discharge is obtained by forcing the power stage at the high impedance condition, and the current charge is obtained by coupling the windings between the power supply and ground (current peak is function of the power supply).

US 2012/0098474 discloses an apparatus for detecting a position of a rotor of an electric motor having three phases and a plurality of windings. The apparatus includes circuitry to couple at least two of the windings between a supply voltage and ground according to a first current path, disconnect the at least two windings and allow the current stored in the two windings to be discharged through a second current path. The apparatus includes a measurement circuit adapted to measure the time period between the start instant of storing the current in the two windings and the final instant of discharging the current in the two windings, and a rotor detector for detecting the rotor position based at least in part on the measured time period.

Even this apparatus is sensitive to the power supply variation because the current discharge is obtained by forcing the power stage at the high impedance condition and the current charge is obtained by coupling the windings between the power supply and ground.

Also, apparatus for detecting the position of a rotor of a DC motor are known which use one sense element for each motor winding. The sense elements are embedded and coupled to the low side (or high side) transistors of the half bridges of the power stage. In this case, these apparatus are sensitive to the intrinsic mismatch of the embedded sense elements.

SUMMARY

One embodiment of the present disclosure provides an apparatus for detecting the rotor position of an electric motor which is less sensitive to the supply variation.

Also, in the case of embedded sense elements, the apparatus according to the present disclosure is less sensitive to the intrinsic mismatch of the embedded sense elements.

One embodiment of the present disclosure is an apparatus for detecting the position of a rotor of a DC motor with N phases having a plurality of windings, the apparatus comprising circuitry to couple at least two of the windings between the supply voltage and ground according to a first current path and allow the current stored in the two windings to be discharged through a second current path, wherein the circuitry is configured to force the at least two windings at a short circuit condition in the second current path. The apparatus also includes a measurement circuit configured to measure the time period of discharge of the current stored in the two windings, and a rotor position detector for detecting the rotor position based on the measured time period.

Another embodiment of the present disclosure is to provide an apparatus for detecting the rotor position of an electric motor which is different from prior art. Particularly, an apparatus for detecting the rotor position of an electric motor according to the present disclosure may reduce the current peak sunk from the power supply.

Another embodiment of the present disclosure is an apparatus for detecting the position of a rotor of a DC motor with N phases having a plurality of windings, the apparatus comprising circuitry having at least two half bridges coupled between the supply voltage and the reference voltage and having the central points coupled with the two winding. The circuitry being configured to control a charge operation of the current passing through at least two of the windings and to control the discharge operation of the current stored in said two windings. The circuitry is also configured to drive the two half bridges in a pulse width modulation modality during the current charge operation and/or during the current discharge operation. The apparatus includes a measurement circuit configured to measure the time period of the current charge operation and/or the current discharge operation, and a rotor position detector for detecting the rotor position based on the measured time period.

BRIEF DESCRIPTION OF THE DRAWINGS

For a better understanding of the present disclosure, preferred embodiments thereof are now described, purely by way of non-limiting examples and with reference to the annexed drawings, wherein.

DETAILED DESCRIPTION

Figure 1:
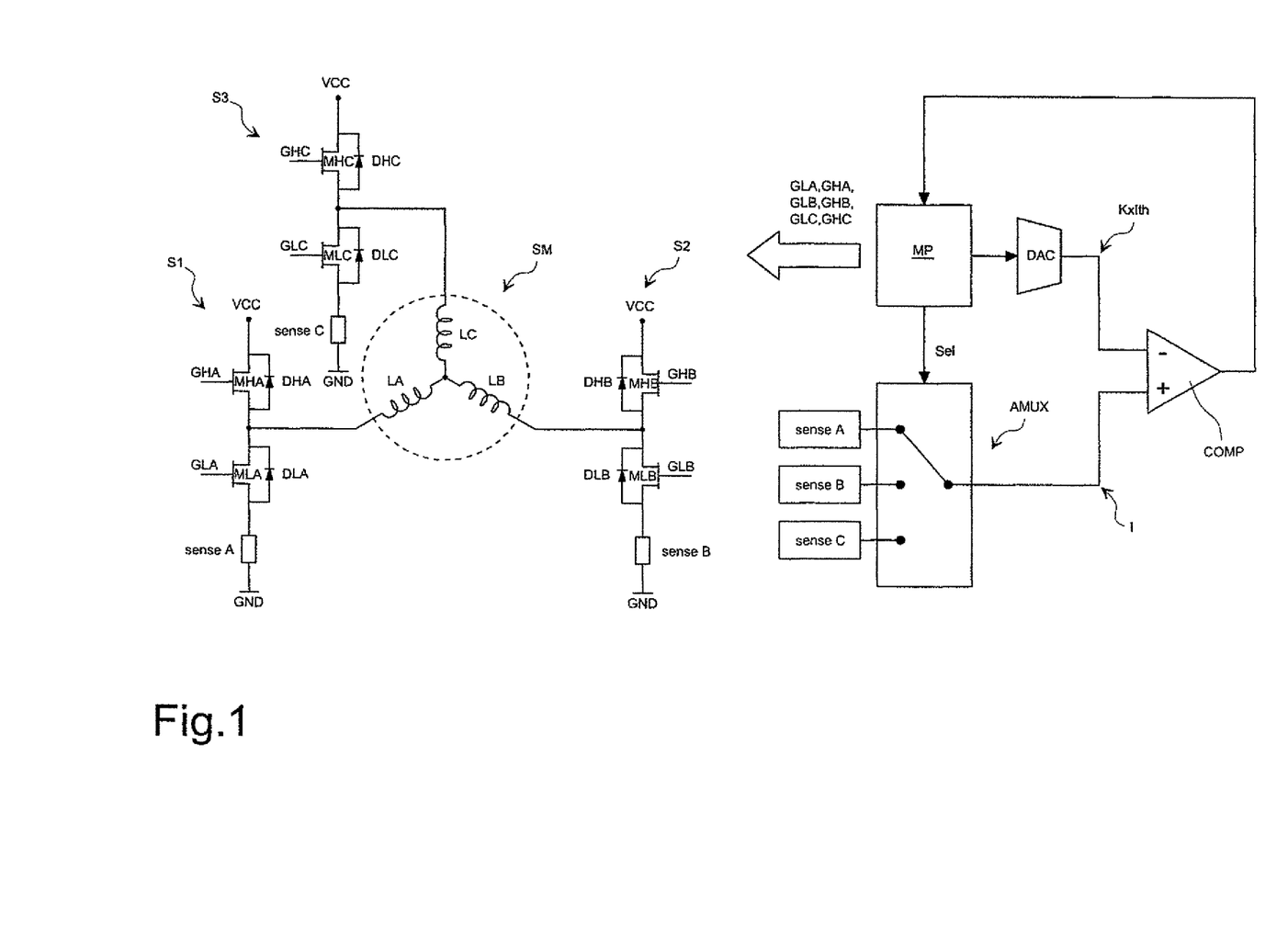
FIG. 1 shows the partial diagram of a driving circuit of a brushless motor with an apparatus for detecting the position of the rotor of the brushless motor according to an embodiment of the present disclosure.

FIG. 1 shows an apparatus for detecting the position of a rotor of an electric motor, in particular, a brushless motor SM according to a first embodiment of the present disclosure. The electric motor is of the N-phase type, preferably having three phases.

The apparatus includes half-bridges S1, S2 and S3 for controlling the brushless motor SM that includes a rotor. FIG. 1 shows the stator of the electric motor SM with the three star-connected phases A, B and C. Each of the half-bridges includes a high side transistor and a low side transistor, each one with the associated recirculating diode, indicated respectively by MHA, MLA and DHA, DLA for the half-bridge S1, and MHB, MLB and DHB, DLB for the half-bridge S2 and MHC, MLC and DHC, DLC for the half-bridge S3. The high-side transistors have their drain terminals coupled to the positive power supply voltage Vcc while the low-side transistors have the source terminals coupled to a reference voltage, for example ground GND, by means of respective sense elements senseA, senseB, senseC. The sense element may be a resistance, a Hall sensor or preferably an embedded sense element, i.e., the MOSFET transistor which is formed during the manufacturing of the low side transistors MLA, MLB and MLC. The sense elements senseA, senseB, senseC may have different gains for the mismatch due to the manufacturing. The source terminal of each high-side transistor is coupled to the drain of each low-side transistor. The connection point of the half-bridge S1 corresponds to the phase A and is coupled to a terminal of the winding LA. The connection point of the half-bridge S2 corresponds to the phase B and is coupled to a terminal of the winding LB. The connection point of the half-bridge S3 corresponds to the phase C and is coupled to a terminal of winding LC. The other terminals of the windings LA, LB and LC are coupled to one another. These windings diagrammatically depict a 3-phase spindle motor SM.

The gate terminals GHA, GLA, GHB, GLB, GHC, GLC of the transistors of the half-bridges S1-S3 are controlled by a control device MP, preferably a microprocessor, which permits to suitably power the phases A, B and C of the motor SM. The voltages of back electromotive force (or BEMF) are at the terminals of the windings A, B and C. However, during the measurement of the rotor position, the motor is stopped and BEMF=0, that is the control device MP provides to stop the motor SM to measure the position of the rotor.

The apparatus comprises a current measurement circuit comprising a multiplexer AMUX controlled by a signal SEL and adapted to select one of the sense currents deriving from the sense elements senseA, senseB, senseC and to send the selected sense current I to the non-inverting input of a comparator COMP adapted to compare the sense current I with a threshold current k×Ith deriving from a digital-to-analogue converter DAC supplied by the digital data deriving from the microprocessor MP.

In operation, the supply voltage Vcc may change, that is the supply voltage may maintain at a level not constant for all the operation time of the driving apparatus of the electric motor.

According to the present disclosure, when the electric motor SM is stopped and BEMF=0, a current pulse is applied to the load comprising two or all the windings LA, LB and LC of the electric motor SM, preferably the series of two windings or the series/parallel arrangement of all the windings. A load comprising two windings may be formed by coupling one winding with the supply voltage Vcc by turning on a correspondent high side transistor of one half bridge, another winding to the reference voltage (ground) by turning on a correspondent low side transistor of another half bridge while the third winding is floating (at high impedance condition). A load including all the windings may be formed by coupling two windings with the supply voltage Vcc by turning on the correspondent high side transistors of the half bridges while the third winding is coupled to the reference voltage (ground) by turning on a correspondent low side transistor of the third half bridge or by coupling two windings with the ground by turning on the correspondent low side transistors of the half bridges while the third winding is coupled to the supply voltage by turning on the correspondent low side transistor of the third half bridge.

The application of the current pulse to the load formed by the motor windings provides information depending on the load by allowing the precise and reliable estimation of the rotor position. In fact the position of the rotor is capable to modify the inductive value of the windings which is due to the magnetic saturation. The position of the rotor may be detected by analyzing the response of a current pulse applied to one or more motor windings.

Figure 2:
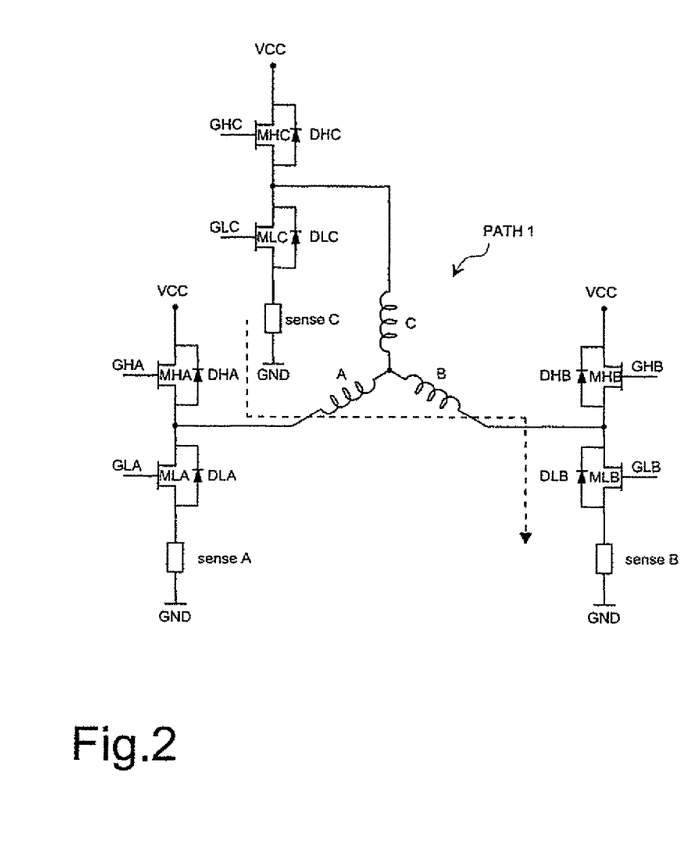
FIG. 2 shows the current path of the current through the windings of the brushless motor under a voltage pulse.

The apparatus for detecting the position of a rotor of an electric motor according to the present disclosure comprises the control device, preferably a microprocessor MP, to apply a current pulse to the motor winding during the excitation step or charging step. Preferably the microprocessor MP controls the turning on of one high side transistor of one of the half-bridge S1-S3 and one low side transistor of a different half-bridge S1-S3, for example by turning on the transistors MHA and MLB. In this way the current flows through the windings LA and LB according to a first current path PATH1 (FIG. 2).

Figure 3:
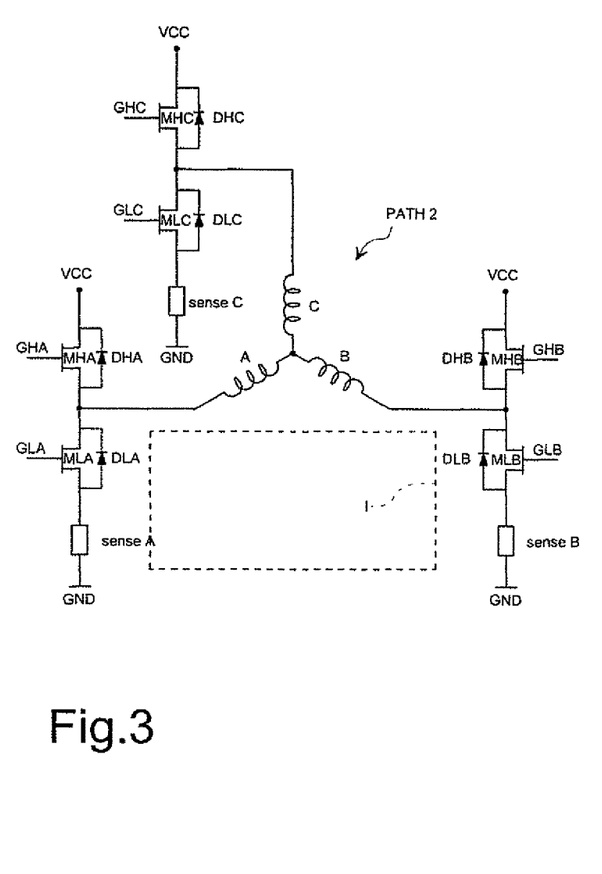
FIG. 3 shows the current discharge path of the current stored in the windings of the brushless motor.

The discharge step is obtained by forcing the windings LA and LB at a short circuit condition and this occurs by turning on both the transistors MLA and MLB using the microprocessor MP or turning on only the transistor MLB and forcing a high impedance condition of the half bridge S1 (FIG. 3). In this way the discharge current I flows through the windings LA and LB according to a second current path PATH2. In this way a single sense element for detecting the current in the first and the second current paths is used. The sense element of the current in the first and the second current paths is the sense element senseB.

The discharge current $I(t)=I0 \times e^{-t/Tau}$ where I0 is the current value at the beginning of the discharge step, Tau is the time constant of the load comprising the series of the windings LA and LB, therefore Tau depends on the features of the windings LA and LB. The value of I0 is the peak value of the current in the first current path.

By calculating the time period TOFF needed for the current I(t) to reach the value k×I0, where k has a value lower than 1, the time period TOFF depends on the winding features and not on the supply voltage or the value of I0. By fixing the current threshold Ith as the current peak I0, the value k×Ith is the value of the current I that determines the final instant of the time period TOFF. The peak value I0=Ith is the current value when the discharging time period starts, that is the maximum value reached by the current I in the second current path.

The apparatus comprises a measurement circuit configured to measure the discharge time period TOFF of the current in the two windings LA and LB and a rotor position detector for detecting the rotor position based on the measured time period TOFF. The measurement circuit and the rotor position detector can be implemented by the microprocessor MP and by the comparator COMP which is configured to compare the sensed current I with the current threshold K×Ith (during the discharging time period TOFF or the second current path PATH2).

As the excited phases change, the sense elements involved during the current discharge step change. There is a need for the selector SEL to allow the comparator COMP to be coupled to the correct terminal. In particular, during the excitation of phase A-B, the multiplexer AMUX should couple the comparator COMP to the sense element senseB; during the excitation of phase A-C, the multiplexer AMUX should couple the comparator COMP to the sense element senseC; during the excitation of phase B-C, the multiplexer AMUX should couple the comparator COMP to the sense element senseC; during the excitation of phase B-A, the multiplexer AMUX should couple the comparator COMP to the sense element senseA; during the excitation of phase C-A, the multiplexer AMUX should couple the comparator COMP to the sense element senseA; and during the excitation of phase C-B, the multiplexer AMUX should couple the comparator COMP to the sense element senseB.

Preferably the determination of the rotor position is based on that the winding impedance depends on the rotor position. For this reason and in particular for a motor having three phases A, B and C, current I is sequentially passed through the following pairs of phases A-B, A-C, B-C, B-A, C-A, C-B, and the time period TOFF is measured, for each pair of phases, and the control circuit MP performs the suitable calculations for determining the rotor position.

Figure 4:
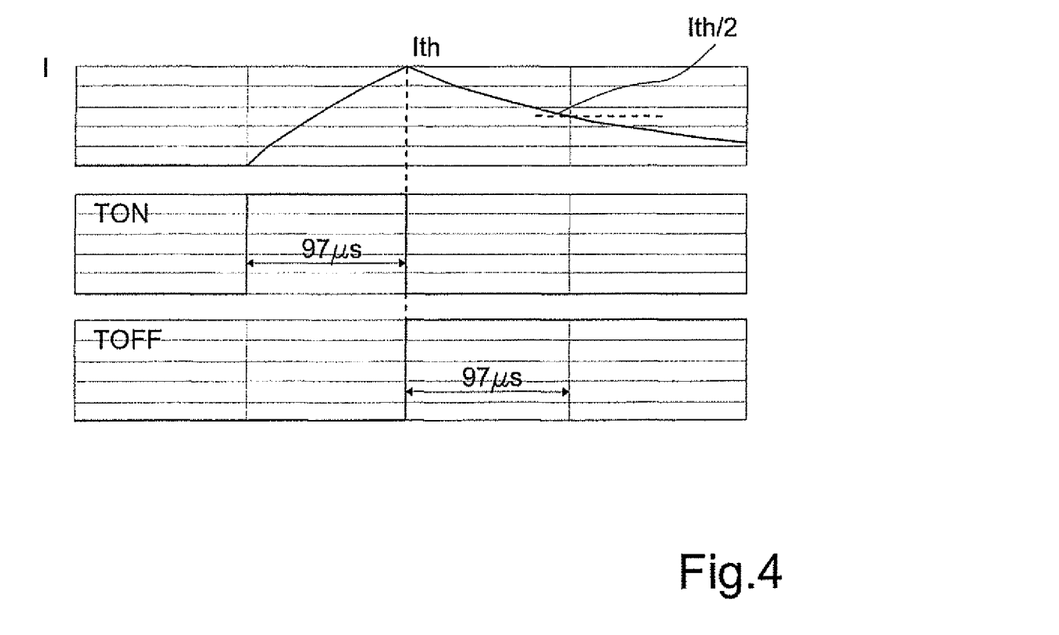
FIG. 4 is a time diagram of the current circulating through a load with a nominal supply voltage.

FIG. 4 shows a time diagram of the current I circulating through a load formed by two windings LA and LB when a current pulse Ip is applied to the load with a supply voltage Vcc at the nominal value, for example Vcc=5V, and wherein the sense element senseB has a unitary gain. The diagram shows the charging step of the current I until reaching the current threshold Ith and a discharging step of the current I until reaching 50% of the current threshold Ith. The discharging step is obtained turning on both the transistors MLA and MLB by the microprocessor MP while TON and TOFF are the time periods employed by the current I to reach the current threshold Ith and 50% of the current threshold Ith. In this case it occurs TON=TOFF=97 microseconds.

Figure 5:
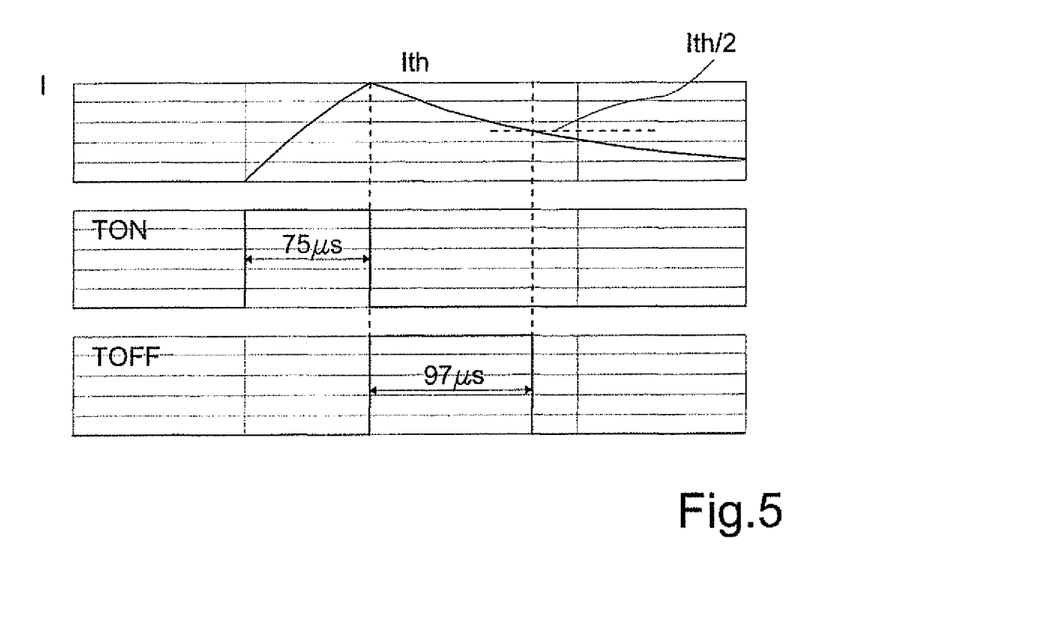
FIG. 5 is a time diagram of the current circulating through a load with a supply voltage increased and showing sense element has a unitary gain.

FIG. 5 shows a time diagram of the current I circulating through a load formed by two windings LA and LB when a current pulse Ip is applied to the load with a supply voltage Vcc which has been increased with respect to the previous case of 20%. That is Vcc=6V, and wherein the sense element senseB has a unitary gain. In this case the time period TON (75 microseconds) is decreased with respect to the previous case in FIG. 4 and the time period TOFF (97 microseconds) is unchanged. That is the time period TOFF which measures the discharge time period of the current I does not depend on the supply voltage Vcc.

Figure 6:
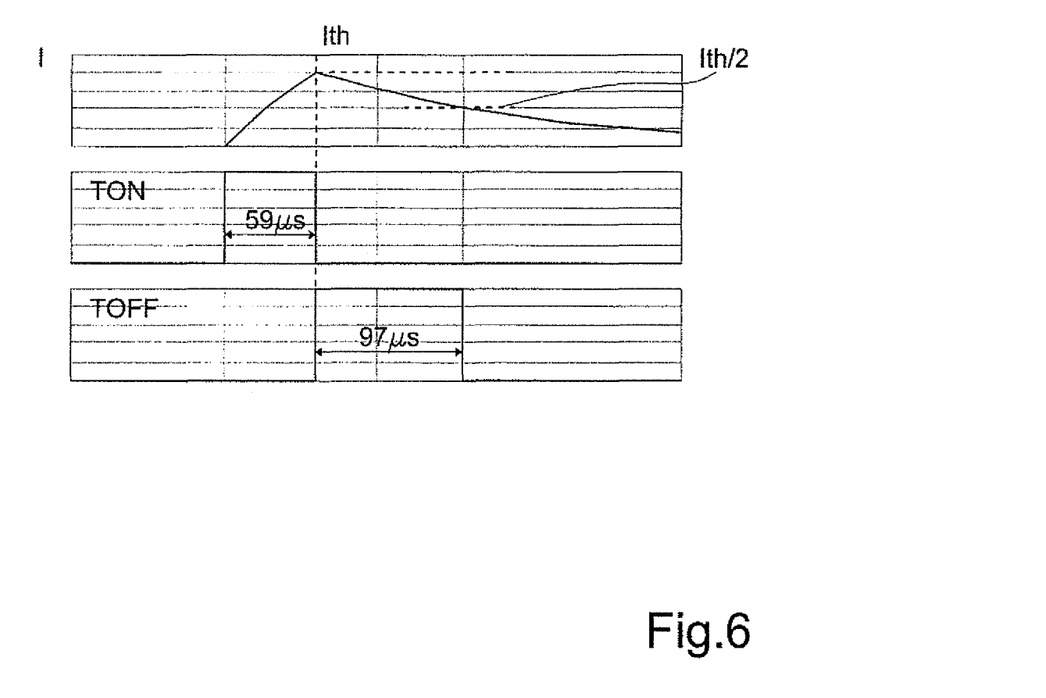
FIG. 6 is a time diagram of the current circulating through a load where the time period TON is decreased.

FIG. 6 shows a time diagram of the current I circulating through a load formed by two windings LA and LB when a current pulse Ip is applied to the load with a supply voltage Vcc which has been increased with respect the previous case of 20%, that is Vcc=6V, and wherein even the gain of the sense element senseB has been increased with respect the previous case of 20%. In this case, the time period TON (59 microseconds) is decreased with respect to the previous case in FIG. 5 and the time period TOFF (97 microseconds) is unchanged, that is the time period TOFF which measures the discharge time period of the current I does not depend on the supply voltage Vcc and the gain of the sense element.

Figure 7:
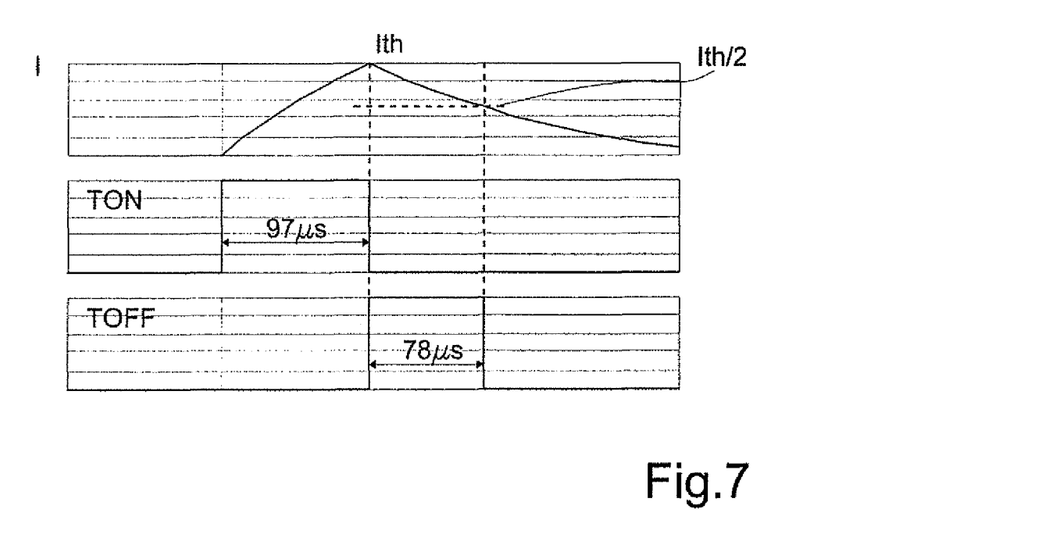
FIG. 7 is a time diagram of the current circulating through a load where the time period TON is greater than TOFF.

FIG. 7 shows a time diagram of the current I circulating through a load formed by two windings LA and LB when a current pulse Ip is applied to the load with a supply voltage Vcc at the nominal value, for example Vcc=5V, and wherein the sense element senseB has a unitary gain. The diagram shows the charging step of the current I until reaching the current threshold Ith and a discharging step of the current I until reaching 50% of the current threshold Ith. The discharging step is obtained by turning on only the transistor MLB and forcing a high impedance condition of the half bridge S1 while TON and TOFF are the time periods employed by the current I to reach the current threshold Ith and 50% of the current threshold Ith. In this case it occurs that TON (97 microseconds) is greater than TOFF (78 microseconds).

By increasing the supply voltage Vcc by 20% with respect to the previous case in FIG. 7, that is Vcc=6V (FIG. 8), the time period TOFF (78 microseconds) remains unchanged. That is the time period TOFF which measures the discharge time period of the current I does not depend on the supply voltage Vcc while the time period TON (75 microseconds) decreases.

Figure 8:
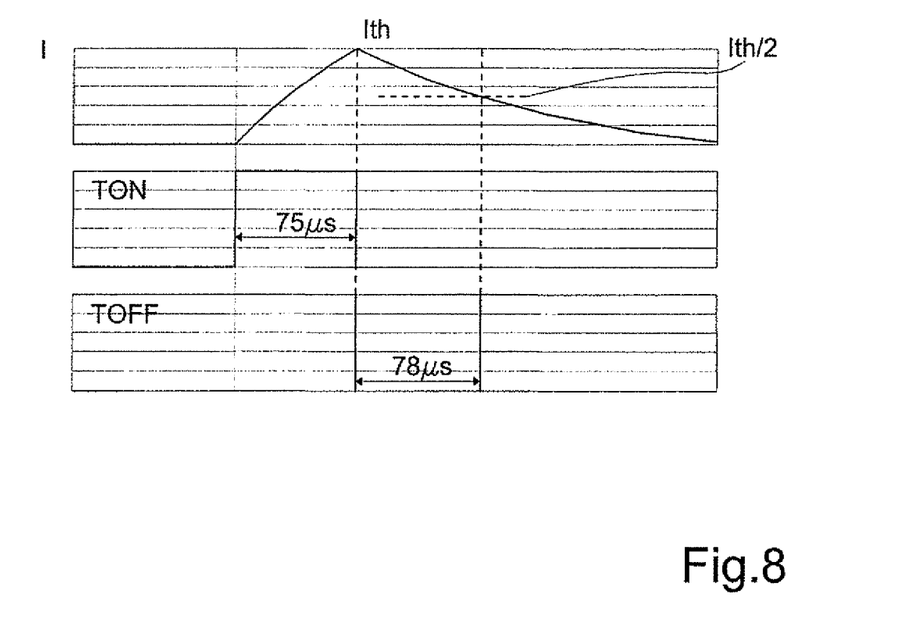
FIG. 8 is a time diagram of the current circulating through a load showing that the current does not depend on the supply voltage while the time period TON decreases.
Figure 9:
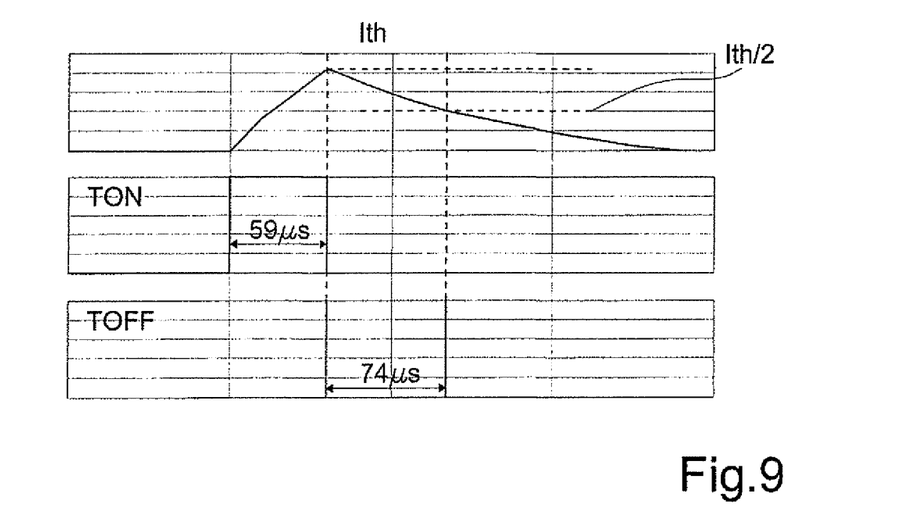
FIG. 9 is a time diagram of the current circulating through a load showing a decrease in both time periods TOFF and TON.

By increasing the gain of the sense element senseB by 20% with respect to the previous case in FIG. 8, that is Vcc=6 V and the gain of senseB is 1.2 (FIG. 9), the time period TOFF (74 microseconds) and the time period TON (59 microseconds) decrease.

Preferably the apparatus of an embodiment of the present disclosure is used for detecting the position of the rotor when the motor SM is stopped.

Figure 10:
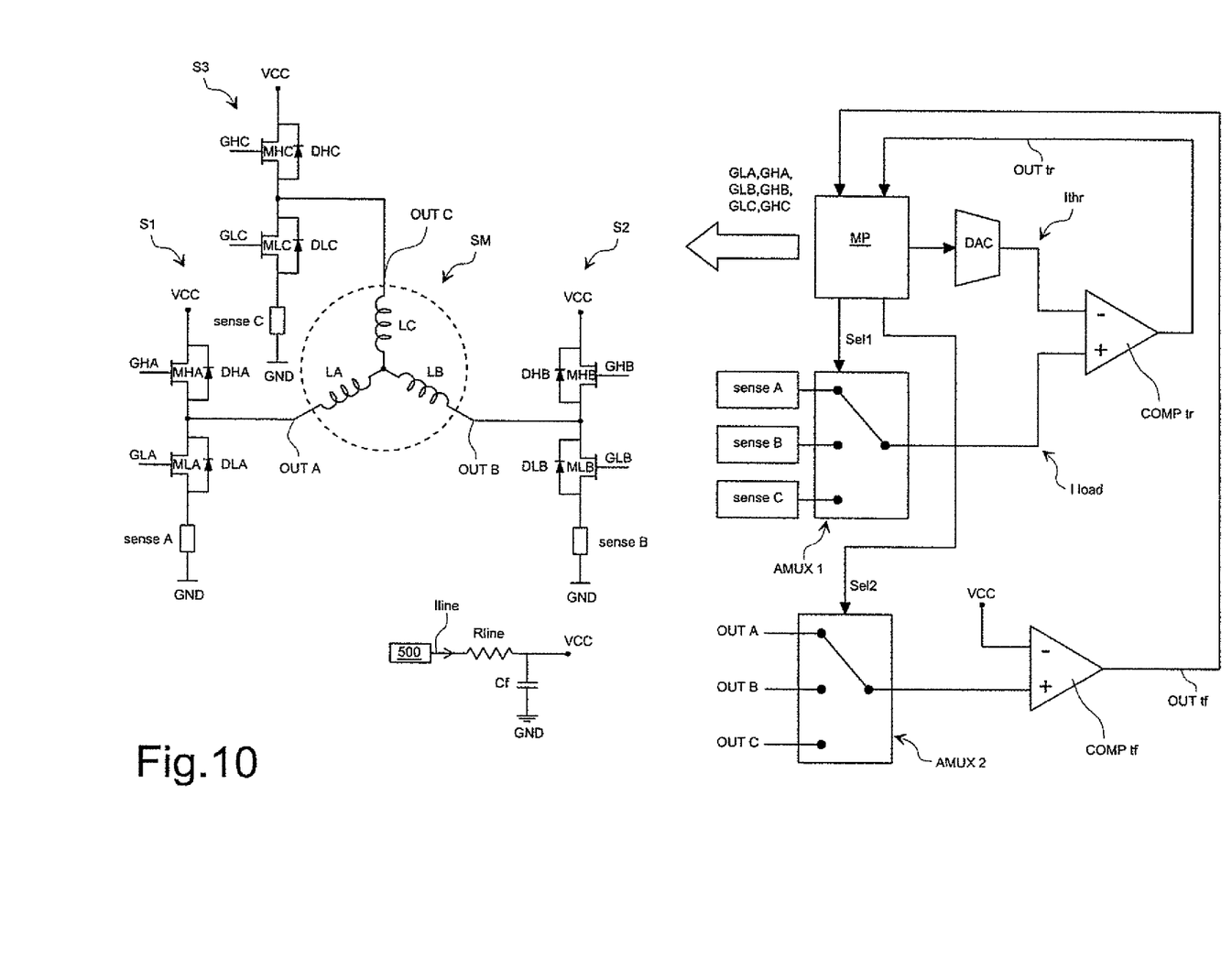
FIG. 10 shows a schematic diagram of a driving circuit of a brushless motor with an apparatus for detecting the position of the rotor of the brushless motor according to another embodiment of the present disclosure.

FIG. 10 shows an apparatus for detecting the position of a rotor of a DC motor, in particular a brushless motor SM, according to another embodiment of the present disclosure. The electric motor is of the N-phase type, preferably having three phases.

The apparatus comprising the power stage includes the half-bridges S1, S2 and S3 for controlling the brushless motor SM having a rotor. FIG. 10 shows the stator of the electric motor SM with the three star-connected phases A, B and C. Each of the half-bridges consists of a high side transistor and a low side transistor, each with the associated recirculating diode, indicated respectively by MHA, MLA and DHA, DLA for the half-bridge S1, and MHB, MLB and DHB, DLB for the half-bridge S2 and MHC, MLC and DHC, DLC for the half-bridge S3. The high-side transistors have their drain terminal coupled to the supply voltage Vcc, deriving from a power supply 500 through a RC filter consisting of the resistance Rline and the capacitor Cf. The resistance Rline represents the resistance of the electric path between the power supply 500 and the PCB comprising the power stages S1-S2 and the control unit. The capacitor Cf represents the capacitors coupled with the same PCB. The low-side transistors have the source terminal coupled to a reference voltage, for example the ground GND, by means of respective sense elements senseA, senseB, senseC. The sense element may be a resistance, a Hall sensor or preferably a MOSFET transistor, i.e. the MOSFET transistor which is formed during the manufacturing of the low side transistors MLA, MLB and MLC. The sense elements senseA, senseB, senseC may have different gains for the mismatch due to the manufacturing. The source terminal of each high-side transistor is coupled to the drain of each low-side transistor. The connection point of the half-bridge S1 corresponds to the phase A and is coupled to a terminal OUTA of the winding LA. The connection point of the half-bridge S2 corresponds to the phase B and is coupled to a terminal OUTB of the winding LB, and the connection point of the half-bridge S3 corresponds to the phase C and is coupled to a terminal OUTC of winding LC. The other terminals of the windings LA, LB and LC are coupled to one another. These windings diagrammatically depict a 3-phase spindle motor SM.

The gate terminals GHA, GLA, GHB, GLB, GHC, GLC of the transistors of the half-bridges S1-S3 are controlled by a control device MP, preferably a microprocessor, to suitably power the phases A, B and C of the motor SM.

The apparatus includes a current measurement circuit having a multiplexer AMUX1 controlled by a signal SEL1 and adapted to select one of the sense currents deriving from the sense elements senseA, senseB, senseC, and a multiplexer AMUX2 controlled by a signal SEL2, and adapted to select one of the terminals OUTA, OUTB, OUTC. The signals SEL1 and SEL2 are provided by the microprocessor MP.

The apparatus may also include a comparator CompTr where the positive input terminal of which is coupled to the output of the multiplexer AMUX1 and at a negative input terminal of which a threshold voltage Ithr is applied, which derives from an digital to analog converter DAC adapted to convert a digital signal deriving from the microprocessor MP into the threshold voltage Ithr. The output OutTr of comparator CompTr is coupled to the microprocessor MP.

The apparatus can include, alternatively or in addition to the comparator CompTr, a comparator CompTf where the positive input terminal of which is coupled to the output terminal of the multiplexer AMUX2 while the negative input terminal is coupled to the power supply voltage Vcc. The output OutTf of comparator CompTf is coupled to the control circuit MP.

The apparatus shown in FIG. 10 uses the sense elements senseA, senseB, senseC for measuring the current circulating in the windings during the excitation step, i.e. for calculating the rise time Tr, while it uses the voltage drop at the terminals of the current recirculating diodes, coupled in parallel to the transistors of the half-bridges S1-S3, for measuring the discharge or fall time Tf. However, other methods for measuring the time periods Tr and Tf are applicable so that the apparatus in the FIG. 10 is therefore to be considered merely indicative.

In accordance with the second embodiment of the present disclosure, the apparatus for detecting the position of the rotor is based on the analysis of the current in the windings upon a PWM signal applied to the power stage S1, S2, S3 during inductive sense. The determination of the rotor position is based on that the winding impedance depends on the rotor position, Preferably for a motor having three phases A, B and C, current Iload is sequentially passed through the following pairs of phases A-B, A-C, B-C, B-A, C-A, C-B. The excitation of each one of the couple of phases A-B, A-C, B-C, B-A, C-A, C-B occurs by way of the PWM power stage with a duty-cycle lower than 100% during inductive sense. Therefore, by analyzing the current, i.e. by analyzing the rise time Tr or the fall time Tf of the current Iload through two winding of the electric motor SM upon the application of the PWM signal, the position of the rotor may be determined.

With the power stage in PWM modality during the charging step of the current in the motor windings, a lowering of the current peak sunk from the power supply occurs. In this way it is possible to use currents with a higher value than in the inductive sense methods previously known. Also the filtering effect of the RC filter formed by the resistor Rline and the capacitor Cf has positive results in the case wherein the power stage S1-S3 operates in PWM modality with a duty-cycle lower than 100%.

Figure 11A:
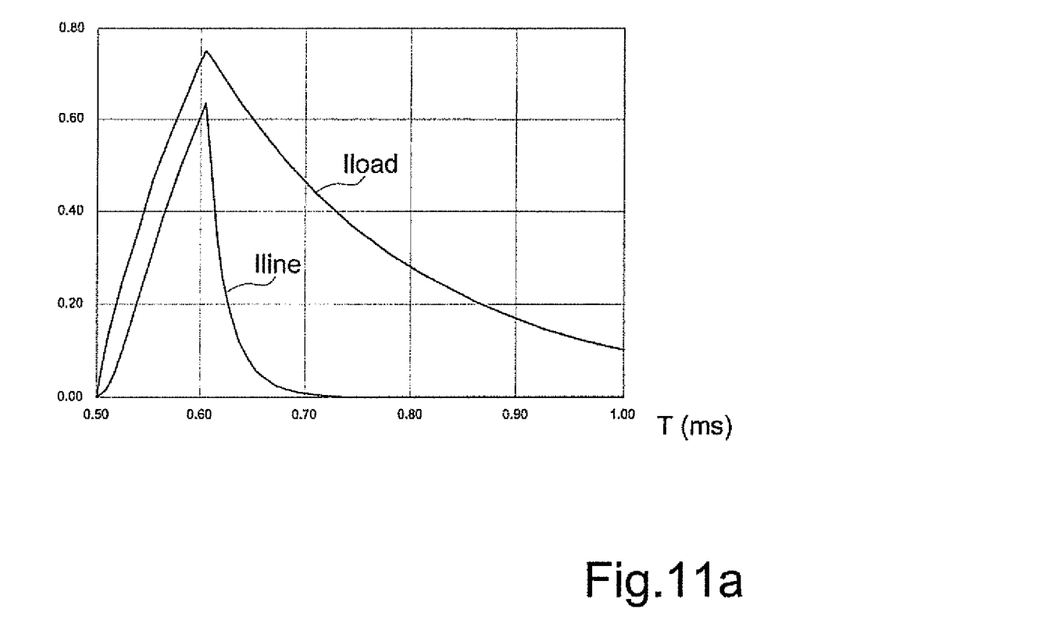
FIG. 11a shows the waveforms of the power supply current and the current passing through the electric motor using a known inductive sense.
Figure 11B:
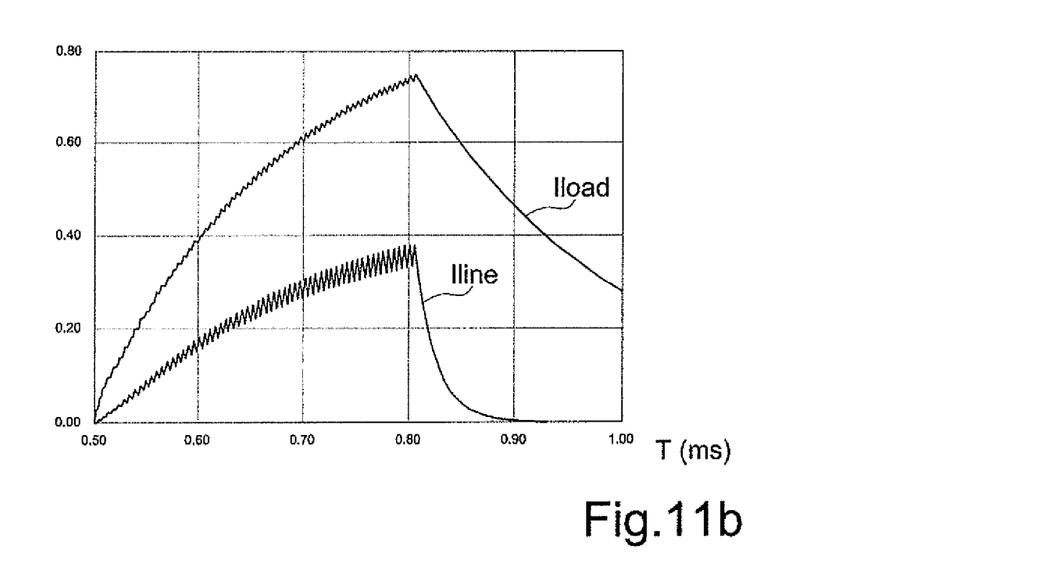
FIG. 11b shows the waveforms of the power supply current and the current passing through the electric motor using the apparatus in FIG. 10 or FIG. 1 during the charge step of the current passing through the electric motor.

FIGS. 11a and 11b show the waveforms of the power supply current Iline and the current Iload passing through the electric motor SM using an inductive sense, wherein the power stage is driven in full saturation during charging step of the current in the motor windings (FIG. 11a). Using the apparatus according to the second embodiment of the present disclosure, the power stage is driven in PWM with a duty-cycle of 50% during the charging step of the current in the motor windings (FIG. 11b). It is illustrated that the current peak of the power supply current Iline is lower in FIG. 11b than in FIG. 11a.

With the power stage in PWM modality only during the discharge time period of the current in the motor windings, a modulation of the current discharge time period is permitted.

Considering patent application US 2012/0098474, the specification of which is incorporated in the present disclosure, for determining the rotor position, the time period Ttot is measured, for each pair of phases, where Ttot=Tr+Tf and the control circuit MP performs the suitable calculations for determining the rotor position. According to the method of the second embodiment of the present disclosure, the charging step is obtained by applying the power supply voltage Vcc to the pair of windings involved, e.g. windings LA and LB, while the discharging step is obtained by applying a PWM driving signal to the power stage S1 and S2 coupled to the pair of windings (e.g. LA and LB again) during current discharge. In this way the duty-cycle of the PWM signal can be modulated for obtaining Tr=Tf. That is the application of the PWM signal during the current discharge allows equalizing the time period Tr and Tf.

Figure 12A:
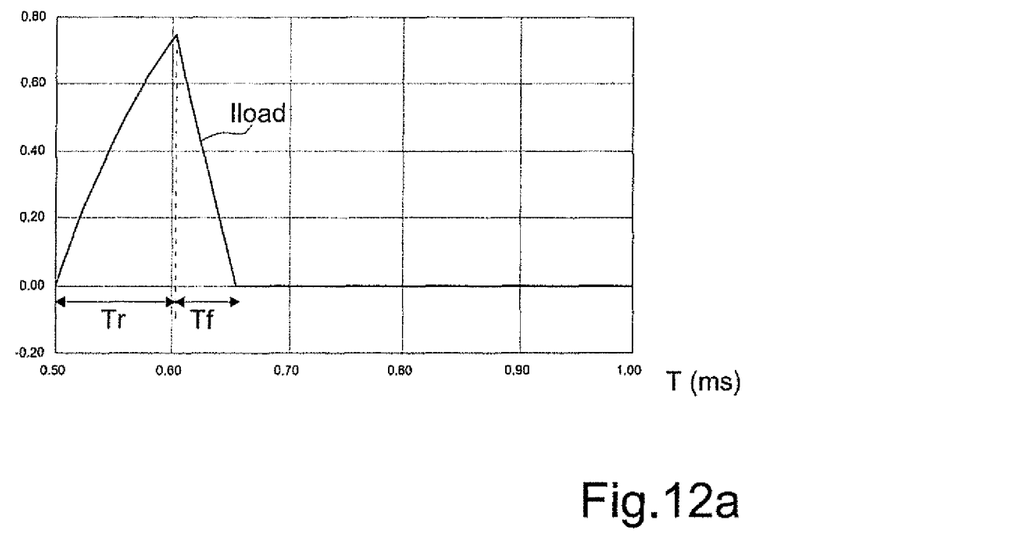
FIG. 12a shows the waveforms of the current passing through the electric motor using a known inductive sense.
Figure 12B:
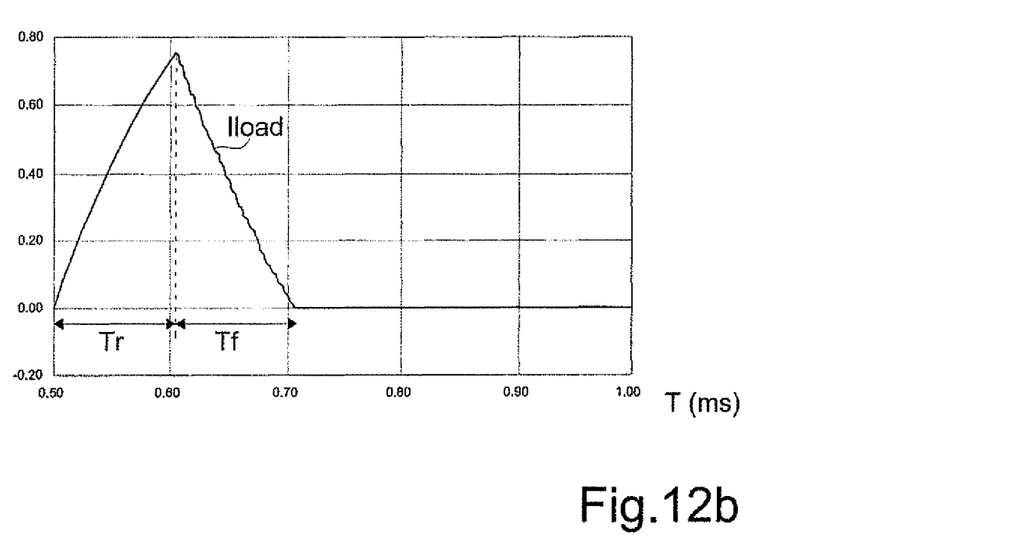
FIG. 12b shows the waveforms of the current passing through the electric motor using the apparatus in FIG. 10 or FIG. 1 during the discharge step of current passing through the electric motor.

FIGS. 12a and 12b show the waveforms of the current Iload passing through the electric motor SM using an inductive sense wherein the power stage is driven in high impedance during the discharging step of the current in the motor windings (FIG. 12a). Using the apparatus according to the second embodiment of the present disclosure, the power stage is driven in PWM during the discharging step of the current in the motor windings (FIG. 12b). FIGS. 12a and 12b illustrate that with the application of the PWM driving signal to the power stage during the discharging step of the current Iload, that Tr=Tf is obtained by suitable modulating of the duty-cycle of the PWM driving signal.

Preferably the determination of the rotor position is based on that the winding impedance depends on the rotor position. For this reason, and in particular for a motor having three phases A, B and C, current I is sequentially passed through the following pairs of phases A-B, A-C, B-C, B-A, C-A, C-B, and the time periods Tr and/or Tf are measured, for each pair of phases, and the control circuit MP performs the suitable calculations for determining the rotor position.

The apparatus of the second embodiment of the present disclosure can be used for detecting the position of the rotor when the motor SM is stopped.

In accordance with the second embodiment of the present disclosure, even the apparatus for detecting the position of the rotor in FIG. 1 can be used by applying a PWM signal to the power stage S1, S2, S3 during inductive sense and analyzing the current in the windings. In this case, the PWM signal is applied only during the charging step of the current in the motor windings and when the motor SM is stopped.

The invention claimed is:

1. An apparatus for detecting a position of a rotor of an electric motor having a plurality of windings, the apparatus comprising:
    a circuit having at least two half-bridges coupled between a supply node and a reference node, the at least two half-bridges having central points coupled with two windings of the plurality of windings;
    the circuit configured to control a current charge operation of a current passing through the two windings via a first current path;
    the circuit configured to drive the at least two half-bridges in a pulse width modulation mode during the current charge operation;
    a measurement circuit configured to measure a time period between a peak value of the current and a second value of the current during a current discharge operation, wherein the current passes through the two windings via a second current path during the discharge operation; and
    a rotor position detector configured to detect a rotor position based on the measured time period.

2. The apparatus according to claim 1, wherein the circuit is configured to drive the two half-bridges in a pulse width modulation mode with a duty-cycle lower than 100%.

3. The apparatus according to claim 1, wherein the circuit is configured to stop the electric motor to detect the rotor position.

4. The apparatus according to claim 1, wherein the electric motor has three phases and three windings.

5. The apparatus according to claim 1, wherein the measurement circuit comprises a Hall sensor.

6. The apparatus according to claim 1, wherein the second value of the current is 50% of the peak value of the current.

7. A method for detecting a rotor position of an electric motor having a plurality of windings by using a circuit comprising at least two half-bridges coupled between a supply node and a reference node and having central points coupled with two windings of the plurality of windings, the method comprising:
    charging a current passing through two of the plurality of windings via a first current path;
    discharging the current stored in the two windings via a second current path;
    driving the at least two half-bridges in a pulse width modulation mode during the charging;
    measuring a time period between a peak value of the current and a second value of the current during the discharging; and
    detecting a rotor position based on the measured time period.

8. The method according to claim 7, wherein a duty-cycle is lower than 100% for the driving two half-bridges in the pulse width modulation mode.

9. The method according to claim 7, wherein a duty-cycle is 50% for the driving two half-bridges in the pulse width modulation mode.

10. The method according to claim 7, further comprising:
    repeating the charging and discharging for each one of pairs of phases of the electric motor;
    measuring the time period of each discharging; and
    detecting the rotor position based on the measured time periods.

11. The method according to claim 7, wherein a voltage of the supply node varies during driving the at least two half-bridges.

12. The method according to claim 7, wherein the second value of the current is 50% of the peak value of the current.

* * * * *